USOO5750933A

United States Patent [19]
Brady

[11] Patent Number: 5,750,933
[45] Date of Patent: May 12, 1998

[54] WELD CABLE END

[75] Inventor: Charles P. Brady, Roseville, Mich.

[73] Assignee: Progressive Tool & Industries Company, Southfield, Mich.

[21] Appl. No.: 711,605

[22] Filed: Sep. 10, 1996

Related U.S. Application Data

[60] Provisional application No. 60/006,234, Nov. 3, 1995.

[51] Int. Cl.$^6$ ..................................................... H01R 4/00
[52] U.S. Cl. .............................................................. 174/135
[58] Field of Search ..................................... 174/135, 65 R, 174/65 SS, 65 G; 439/447, 449

[56] References Cited

U.S. PATENT DOCUMENTS

| | | | |
|---|---|---|---|
| 1,653,376 | 12/1927 | Skelly. | |
| 2,922,870 | 1/1960 | Collins et al. | 219/125 |
| 2,927,992 | 3/1960 | Bateman | 219/125 |
| 3,242,311 | 3/1966 | Rutherford | 219/130 |
| 3,501,613 | 3/1970 | Cornell, Jr. | 219/130 |
| 3,522,578 | 8/1970 | Newman | 339/101 |
| 3,720,906 | 3/1973 | Punako et al. | 339/101 |
| 3,772,453 | 11/1973 | O'Brien | 174/65 SS |
| 3,792,415 | 2/1974 | Fuller | 339/60 |
| 4,226,432 | 10/1980 | Nakamizo | 277/212 F |
| 4,314,094 | 2/1982 | Smith | 174/78 |
| 4,367,967 | 1/1983 | Albert, Jr. | 403/41 |
| 4,507,042 | 3/1985 | Suzuki et al. | 414/680 |
| 4,629,275 | 12/1986 | Maul | 339/103 R |
| 4,808,774 | 2/1989 | Crane | 174/135 |
| 4,939,337 | 7/1990 | Gente | 219/125.11 |
| 5,018,987 | 5/1991 | Kirma | 439/445 |
| 5,030,135 | 7/1991 | Plesinger | 439/447 |
| 5,050,786 | 9/1991 | DeMott | 224/253 |
| 5,092,793 | 3/1992 | Stephan | 439/446 |
| 5,235,134 | 8/1993 | Jaycox | 174/87 |
| 5,300,734 | 4/1994 | Suzuki | 174/152 G |
| 5,350,895 | 9/1994 | Tanitomi | 219/124.31 |
| 5,422,437 | 6/1995 | Schnell | 174/65 R |
| 5,422,614 | 6/1995 | Rampalli et al. | 333/237 |

FOREIGN PATENT DOCUMENTS

| | | | |
|---|---|---|---|
| 299176 | 10/1928 | United Kingdom. | |
| 1473294 | 5/1977 | United Kingdom | H02G 3/08 |

*Primary Examiner*—Kristine L. Kincaid
*Assistant Examiner*—Joseph Waks
*Attorney, Agent, or Firm*—Young & Basile, P.C.

[57] ABSTRACT

A flexible strain relief device having a center through aperture for receiving cable end portions to be installed into a carrier. The strain relief device has a solid cone shaped portion and a rectangular portion constructed of flexible material having self-extinguishing properties. The rectangular portion is configured to permanently bond to a nut adapter. The perimeter defining the through aperture of the solid cone-shaped portion includes angled circumferential ribs extending partially into the aperture for providing ease during insertion of the cable end portions and resistance for removal of the cable end portions. The nut adapter includes a first member secured to an upper portion of the inner perimeter defining the through aperture; and a rotatable member which is rotatably attached to the first member for operative connection to the carrier so that cone-shaped portion can rotate relative to the carrier.

8 Claims, 2 Drawing Sheets

WELD CABLE END

This application claims the benefit of U.S. Provisional application 60/006,234 filed on Nov. 3, 1995, now abandoned.

FIELD OF THE INVENTION

The invention is a flexible support for a welded cable end.

BACKGROUND OF THE INVENTION

It is known to provide support grips or enclosures to support the weight of electrical cables or metal rods at a junction point. The purpose of the support grips is to absorb the stress and strain from movement and vibration of the electrical cables and rods at the point where the cables or rods are connected to a rigid structure. Current support grips are made of a high grade wire mesh forming a flexible strand. The mesh wire envelopes and conforms to the shape of the cables. Although the current mesh support grips provide adequate safety factors for many applications, the wire mesh construction is not feasible for the support of wiring cables used in such applications where there is cyclical motion. During these instances, the cables are subject to continuous bending motion which wears and frays the cables. This is particularly true in the area of robotics applications where there is continuous rotational and twisting movement. In robotics applications, the wiring cables supported by the current mesh support grips resulted in fatigue failure of the mesh support grips near the connection port after approximately 5000 cycles.

SUMMARY OF THE INVENTION

The current invention provides a cable support grip connectable to a junction port and receiving an end portion of cables therein that does not fatigue during its cyclical motion containing both rotational and twisting movement; and thereby preventing torsional forces being applied to the cables.

The cable support grip includes a boot enclosure for the wire cables installed at a junction where the cables are connected to a carrier. The boot enclosure includes attachment means to the carrier wherein the attachment means allows for rotational movement of the boot enclosure relative to the carrier.

The boot enclosure is made of flexible material that allows for the twisting of the boot enclosure and the cable therein during its cyclical movements. The boot enclosure is generally cone shaped and having an aperture therethrough for allowing insertion of the cable. Resistance means are located and configured in the aperture to allow easy insertion of the cable to the junction point and to prevent the cable from being easily removed once installed.

Accordingly, it is an object of this invention to provide a cable end support that protects the cable end from rotational and torsional stress.

It is another object of this invention to insure contact of the end cable wires with the junction port and to prevent breakage therefrom.

It is further an object of this invention to provide a cable end support that is resistant to heat.

It is still another object of this invention to provide easy insertion of the cable into the cable end support and provide resistance during removal therefrom.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
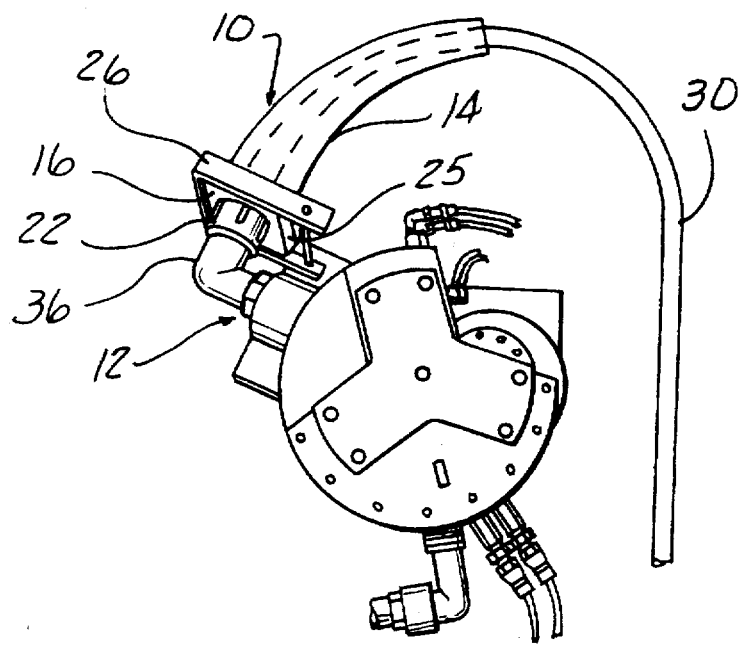
FIG. 1 is a flexible support for a welded cable end according to the present invention, wherein the flexible support is shown attached to a carrier and having a cable extending therefrom.
Figure 2:
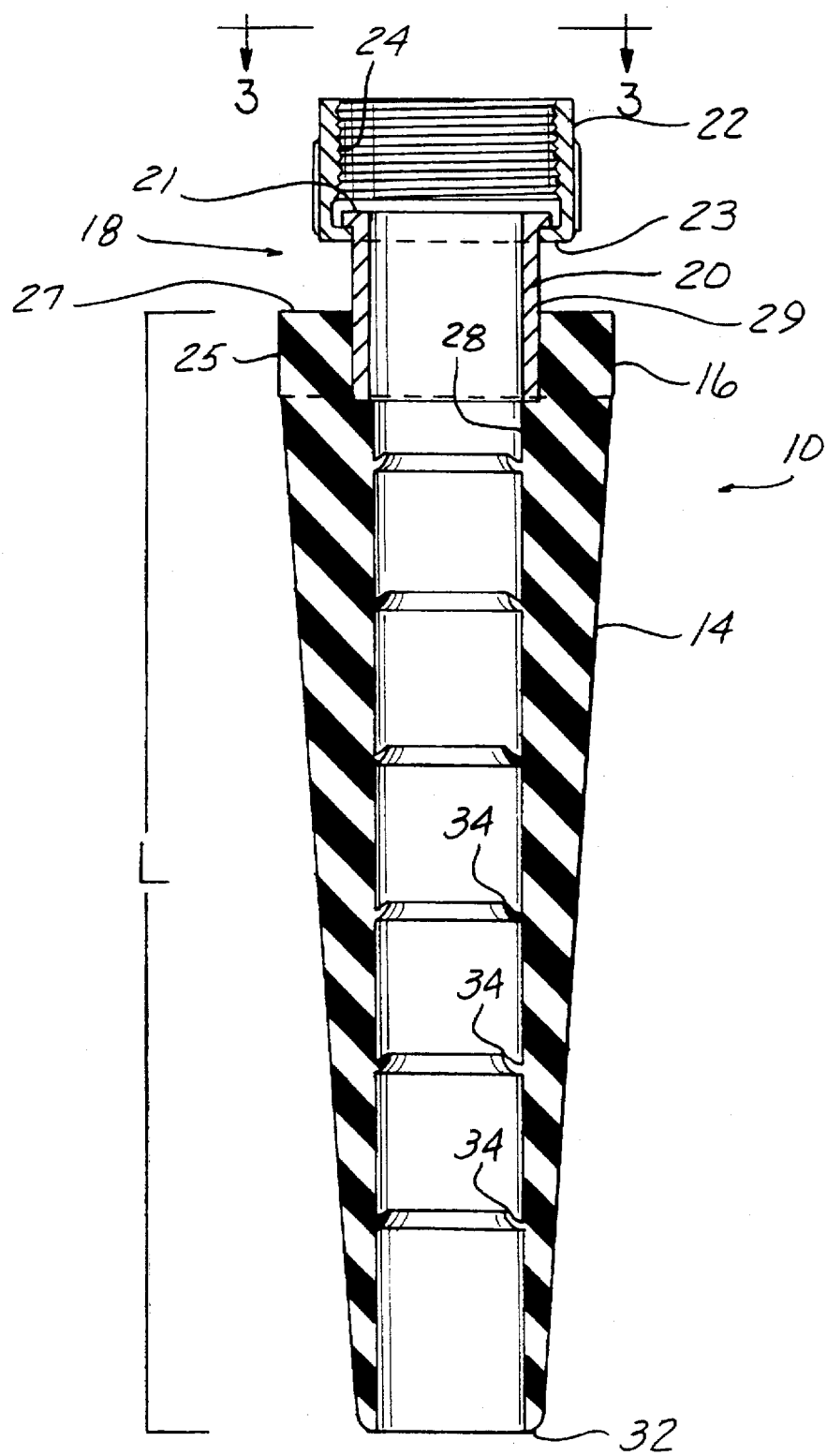
FIG. 2 is a side view of the flexible support of FIG. 1.

The invention is a flexible cable support grip 10 that is secured over at least one cable end at a junction port to a carrier 12. FIG. 1 shows the invention installed on a carrier 12, such as a robotics arm. As seen clearly in FIG. 2, the flexible cable support grip 10 includes a cable boot having a structure including a solid cone-shaped portion 14 and a solid rectangular portion 16. The cone-shaped portion 14 is integral with rectangular portion 16 and extends therefrom. The rectangular portion 16 is configured to be permanently bonded or molded to a nut adapter 18. The nut adapter 18 includes a first member 20 and a second member 22. The first member 20 is bonded or molded to an upper inner perimeter defining a portion of a through aperture 28 in the cable boot. First member 20 has an upper flange 21 that encloses a lower lip 23 of the second member 22 so that the second member 22 rotates relative to the first member 20, and first member 20 together with cable boot 10 rotate relative to the second member 22, when the second member 22 is connected to carrier 12. The upper flange 21 is spaced away from the upper flat surface 27 of the rectangular portion 16 so that second member 22 has axial movement along the outer surface 29 of first member 20. In addition there is some play between lower lip 23 and outer surface 29 so that the cable boot may be allowed a limited amount of angular movement relative to the junction carrier 12. The second member 22 includes a threaded female portion 24 for connection to the carrier 12.

Figure 3:
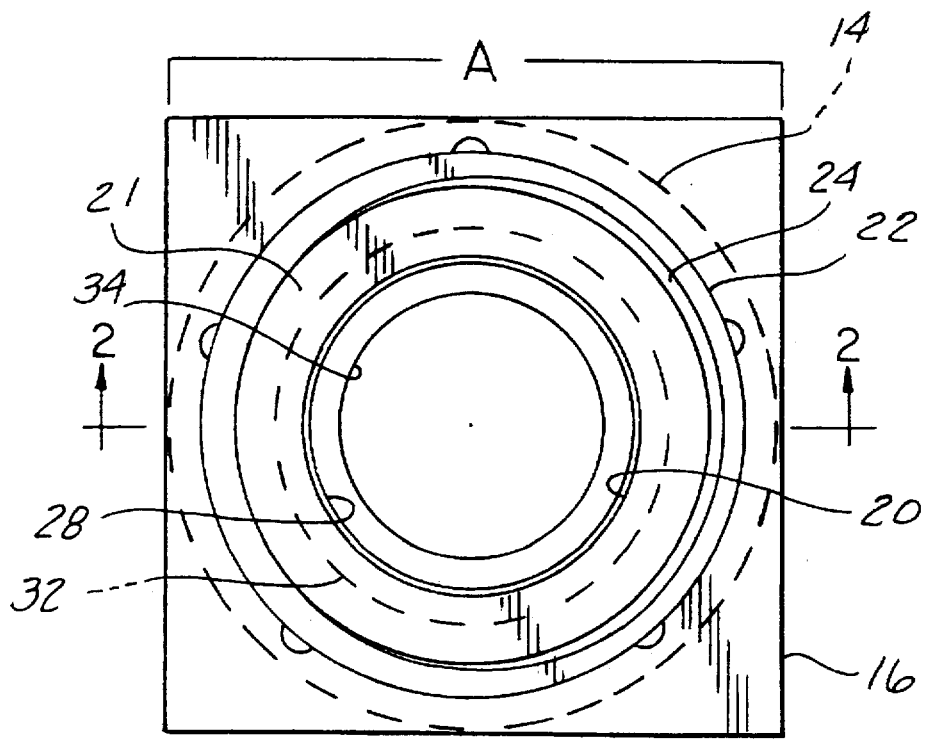
FIG. 3 is a top view of the flexible support taken along lines 3—3 of FIG. 2.

The rectangular portion 16 of the flexible cable boot 10 provides a stable and flat external surface 25 upon which to anchor a support, such as a bracket or brace 26 for attachment to the carrier 12 in certain applications. The cable boot varies in size to accommodate standard cable sizes. The rectangular portion 16 can be manufactured with a minimum size of two by two inch dimension at its base (A) for an eight inch total length (L) of the cable boot, and a maximum dimension of four by four inch rectangular base portion for a sixteen inch total length (L) cable boot. It is clear that the base (A) and length (L) size may vary to accommodate various cable configurations. It is also clear that the rectangular portion 16 can have a square base (A) as shown in FIG. 3, as well as a rectangular base (A).

A center through aperture 28 extends the axial length of cable support grip 10 from a first end 32 of the cone-shaped portion 14 to the nut adapter 18 allowing for insertion of a cable 30. The preferred diameter of the aperture 28 is sized to snugly accommodate a #6 three conductor cable, generally having an outside diameter of 1⅛ inches.

Located concentric around the perimeter defining aperture 28 within the flexible cable boot, and extending partially into the aperture 28 are circumferential ribs or ridges 34 formed integrally with the cable boot. The ridges 34 are angled toward the rectangular portion 16 of the cable boot 10 so that insertion of the cable 30 is smooth and easily accomplished through end 32 of the cable boot. The ridges 34 are configured as described to provide resistance for removing the cable 30 once installed within the cable support grip 10. The ridges 34 preferably extend the axial length of the through aperture 28 starting proximate to the nut adapter 18 and terminating approximately two or three inches from end 32. The ridges 34 terminate before end 32 because the amount of material in the cable boot proximate to end 32 is not substantial enough to support the ridges 34 gripping the cable 30. The circumferential ridges 34 are essentially evenly spaced along the axial length. There are approximately four to eight circumferential ridges 34 along the axial length of aperture 38 with a preferred number of seven or eight ridges.

The preferred material of the flexible cable boot portion of the cable support grip 10 is an elastomer product. The elastomer should have a Durometer hardness number between 30 and 60 and preferably 40–45. It is further desired that the elastomer has a self-extinguishing characteristic in the presence of a flame or extreme heat. Testing indicates that material comprising essentially polyurethane, rubber or neoprene provide excellent flexibility and durability as well as attaining the aforementioned characteristics.

In practice, a cable 30 for installation into a carrier 12, such as a robotics arm, is inserted into the flexible cable support grip 10 through end 32 and fed through aperture 28 until a portion of cable 30 is exposed through the adapter nut 18. As the cable 30 is being fed through aperture 28, the circumferential ridges 34 contract slightly in the direction toward adapter nut 18. If tension is applied to cable 30 at end 32, the ridges 34 expand slightly against cable 30 to securely hold cable 30 in place. Once cable 30 is installed into flexible cable support grip 10, the exposed end portion of cable 30 can be wired into the appropriate function, and adapter nut 18 can be threadably attached to a junction box 36 of the carrier 12. With the second member 22 threadably attached to carrier 12, the first member 20 together with cable boot 10 is free to rotate relative to carrier 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cable support grip for receiving at least one cable end which connects to a junction box, said cable support grip having a first end for placement spaced from the junction box and a second end for placement proximate to the junction box, said cable support grip comprising:
    a generally cone shaped body;
    a base portion attached and integral to the cone shaped body, said cone shaped body and said base portion having a through aperture having a constant diameter throughout a full length of said cone shaped body for receiving said at least one cable end; and attachment means at the second end for attaching said cable support grip to said junction box, wherein said attachment means includes a rotatable member and a stationary member.

2. The cable support grip of claim 1, wherein said through aperture defines an inner surface of said cone shaped body, said inner surface includes axially spaced, inwardly projecting ribs extending the full length of said cone shaped bold.

3. The cable support grip of claim 2, wherein the ribs are uniformly tapered toward the second end of the cable support grip.

4. The cable support grip of claim 1 wherein the stationary member of the attachment means is fixedly attached to said second end of the cable support grip, said stationary member having a through aperture in axial alignment to the through aperture of said cone shaped body and base portion and said stationary member having a stop means spaced from said base portion for communicating with the rotatable member and allowing said rotatable member axial and rotational movement between said stop means and said base portion.

5. The cable support grip of claim 4 wherein the rotatable member includes connecting means to the junction box such that the rotatable member is removably connected to the junction box and the cone shaped body and the stationary member rotate together relative to the rotatable member.

6. The cable support grip of claim 1 wherein the generally cone shaped body is formed of an elastomer material having a Durometer hardness between 30–60.

7. The cable support grip of claim 6 wherein the material has self-extinguishing characteristics in the presence of a flame or heat.

8. The cable support grip of claim 6 wherein the material has a Durometer hardness between 40–45.

* * * * *